(12) United States Patent
Abatzoglou (10) Patent No.: US 7,064,702 B1
(45) Date of Patent: Jun. 20, 2006

(54) SYSTEM, METHOD AND COMPUTER PROGRAM PRODUCT FOR REDUCING QUADRATIC PHASE ERRORS IN SYNTHETIC APERTURE RADAR SIGNALS

(75) Inventor: Theagenis J. Abatzoglou, Huntington Beach, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 11/069,259

(22) Filed: Mar. 1, 2005

(51) Int. Cl.
*G01S 13/90* (2006.01)

(52) U.S. Cl. ............... 342/25 F; 342/25 A; 342/25 E; 342/25 R (58) Field of Classification Search ............ 342/25 A, 342/25 B, 25 F, 25 R, 25 E
See application file for complete search history.

(56) References Cited

U.S. PATENT DOCUMENTS

| | | | |
|---|---|---|---|
| 4,034,370 A | 7/1977 | Mims | |
| 4,771,287 A | 9/1988 | Mims | |
| 4,924,229 A | 5/1990 | Eichel et al. | |
| 4,999,635 A | 3/1991 | Niho | |
| 5,012,249 A | 4/1991 | Chan | |
| 5,043,734 A * | 8/1991 | Niho | 342/25 A |
| 5,200,754 A * | 4/1993 | Niho | 342/25 D |
| 5,248,976 A | 9/1993 | Niho et al. | |
| 5,250,952 A | 10/1993 | Roth | |
| 5,343,204 A | 8/1994 | Farmer et al. | |
| 5,424,743 A | 6/1995 | Ghiglia et al. | |
| 5,546,085 A * | 8/1996 | Garnaat et al. | 342/25 A |
| 5,708,436 A | 1/1998 | Loiz et al. | |
| 5,744,710 A | 4/1998 | Abatzoglou et al. | |
| 5,748,507 A | 5/1998 | Abatzoglou et al. | |
| 5,774,089 A | 6/1998 | Bamler et al. | |
| 6,037,892 A | 3/2000 | Nikias et al. | |
| 6,155,704 A | 12/2000 | Hunt et al. | |
| 6,255,891 B1 | 7/2001 | Samaniego | |
| 6,603,424 B1 | 8/2003 | Abatzoglou | |

OTHER PUBLICATIONS

Barbarossa, S., "New autofocussing technique for SAR images based on the Wigner-Ville distribution", Electronics Letters, vol. 26, Issue 18, Aug. 1990, pp. 1533-1534.*
Greg Welch, Gary Bishop; *SCAAT: Incremental Tracking with Incomplete Information*; 12 pages; University of North Carolina at Chapel Hill.

(Continued)

*Primary Examiner*—Ian J. Lobo
(74) *Attorney, Agent, or Firm*—Alston & Bird LLP (57) ABSTRACT

A method is provided for reducing quadratic phase errors in synthetic aperture radar signals from a plurality of range lines where each range line includes a plurality of azimuth positions. The method includes receiving a plurality of slow-time samples representing radar signals for a plurality of azimuth positions for a plurality of range lines. A plurality of corrected samples and an initial quadratic phase error coefficient are identified based upon the slow-time samples. The corrected samples are processed according to a super-resolution signal processing technique to thereby obtain a plurality of estimated Doppler frequencies for a plurality of point scatterers at each range line, after which a true signal for each range line is reconstructed based upon the plurality of estimated Doppler frequencies. A correction to the initial quadratic phase error coefficient is then obtained based upon the corrected samples, the true signals and the initial quadratic phase error coefficient.

22 Claims, 5 Drawing Sheets

OTHER PUBLICATIONS

Theagenis J. Abatzoglou, Gregory O. Green; *Range, Radial Velocity, and Acceleration MLE Using Radar LFM Pulse Train*; IEEE Transactions on Aerospace and Electronic Systems; Oct. 1998; pp. 1070-1084; vol. 34, No. 4.

R.P. Perry, R.C. DiPietro; R.L. Fante; *SAR Imaging of Moving Targets*; IEEE Transactions of Aerospace and Electronic Systems; Jan. 1999; pp. 188-200; vol. 35, No. 1.

Peter S. Maybeck; *Stochastic models, estimation, and control*—vol. 1; Chapater 1; Dec. 1999; 19 pages; Academic Press, Inc., New York, New York.

Pascal Sebah, Xavier Gourdon; *Newton's method and high order iterations*; Oct. 2001; 10 pages.

Greg Welch, Gary Bishop; *An Introduction to the Kalman Filter* (Siggraph 2001, Course 8); Aug. 2001; 36 pages; ACM, Inc.

Steve Plimpton, Gary Mastin, Dennis Ghiglia; *Synthetic Aperture Radar Image Processing on Parallel Supercomputers*; 7 pages; Sandia National Laboratories; Albuquerque, New Mexico; available in Proc of Supercomputing '91, Albuquerque, New Mexico, Nov. 1991, pp. 446-452.

\* cited by examiner

SYSTEM, METHOD AND COMPUTER PROGRAM PRODUCT FOR REDUCING QUADRATIC PHASE ERRORS IN SYNTHETIC APERTURE RADAR SIGNALS

FEDERALLY SPONSORED RESEARCH OR DEVELOPMENT

This invention was made with government support. The government may have certain rights in this invention.

FIELD OF THE INVENTION

The present invention relates generally to systems and methods of processing synthetic aperture radar signals and, more particularly, relates to systems and methods of autofocusing synthetic aperture radar signals utilizing superresolution processing to reduce quadratic phase errors.

BACKGROUND OF THE INVENTION

There has been a continuing effort to develop radar systems which are suitable for high-resolution applications, such as ground-mapping and air reconnaissance. Initially, this finer resolution was achieved by the application of pulse-compression techniques to conventional radar systems which were designed to achieve range resolution by the radiation of a short pulse, and angular, or azimuth, resolution by the radiation of a narrow beam. The pulse-compression techniques provided significant improvement in the range resolution of the conventional radar systems, but fine angular resolution by the radiation of a narrow beam still required a large-diameter antenna which was impractical to transport with any significant degree of mobility. Subsequent to the development of pulse-compression techniques, synthetic aperture radar (SAR) techniques were developed for improving the angular resolution of a radar system to a value significantly finer than that directly achievable with a radiated beam width from a conventional antenna of comparable diameter.

In prior techniques, an equivalent to a large-diameter antenna was established which was comprised of a physically long array of antennas, each having a relatively small diameter. In the case of a long antenna array, a number of radiating elements were positioned at sampling points along a straight line and transmission signals were simultaneously fed to each element of the array. The elements were interconnected such that simultaneously received signals were vectorially added to exploit the interference between the signals received by the various elements to provide an effective radiation pattern which was equivalent to the radiation pattern of a single element multiplied by an array factor. That is, the product of a single element radiation pattern and the array factor resulted in an effective antenna pattern having significantly sharper antenna pattern lobes than the antenna pattern of the single element.

SAR systems are based upon the synthesis of an effectively long antenna array by signal processing means rather than by the use of a physically long antenna array. With an SAR, it is possible to generate a synthetic antenna many times longer than any physically large antenna that could be conveniently transported. As a result, for an antenna of given physical dimensions, the SAR will have an effective antenna beam width that is many times narrower than the beam width which is attainable with a conventional radar. In most SAR applications, a single radiating element is translated along a trajectory, to take up sequential sampling positions. At each of these sampling points, a signal is transmitted and the amplitude and the phase of the radar signals received in response to that transmission are stored. After the radiating element has traversed a distance substantially equivalent to the length of the synthetic array, the signals in storage are somewhat similar to the signals that would have been received by the elements of an actual linear array antenna.

A SAR can obtain a resolution similar to a conventional linear array of equivalent length as a consequence of the coherent transmission from the sampling points of the SAR. The stored SAR signals are subjected to an operation which corresponds to that used in forming the effective antenna pattern of a physical linear array. That is, the signals are added vectorially, so that the resulting output of the SAR is substantially the same as could be achieved with the use of a physically long, linear antenna array.

In generating the synthetic antenna, the signal processing equipment of an SAR operates on a basic assumption that the radar platform travels along a straight line trajectory at a constant speed. In practice, an aircraft carrying the radar antenna is subject to deviations from such non-accelerated flight. It is therefore necessary to provide compensation for these perturbations to straight-line motion. This motion compensation must be capable of detecting the deviation of the radar platform path from a true linear path.

Figure 1:
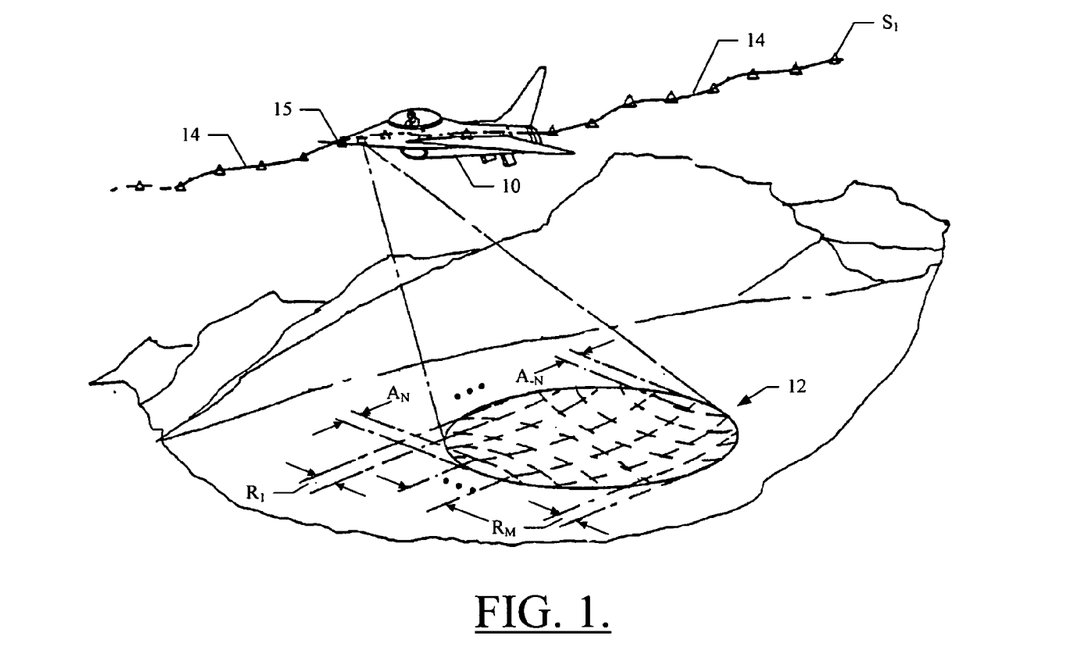
FIG. 1 is a pictorial view of an aircraft following a defined flight path and mapping terrain with a synthetic aperture radar (SAR) system according to one embodiment of the present invention.

Briefly, and referring now to FIG. 1 in the drawings, an SAR system carried by an aircraft 10 maps a target region 12 by transmitting and receiving radar signals at various sampling points $S_1, \ldots, S_N$, along the flight path 14 of the aircraft. In this regard, the SAR system may be positioned in the nose portion 15 of the aircraft. As the SAR system operates, errors can be introduced into the system that, if not compensated for, will corrupt the signal phase, possibly to the extent that the resulting degraded image is of no practical use. Such errors can be introduced from a variety of sources, including errors in motion measurements, inaccurate acceleration estimates and atmospheric/ionospheric propagation effects. Such errors can be rather arbitrary and perhaps describable by a wide-band random process. Thus, a need exists to process the received radar signals to compensate for such errors to achieve the highest quality SAR image. Conventional processing techniques, however, typically suffer from lack of accuracy in situations where target/clutter-to-noise ratios are low or there are several competing scatterers in a given range cell. Such drawbacks are typical, for example, in techniques based on phase (pulse-pair product) comparisons.

SUMMARY OF THE INVENTION

In light of the foregoing background, the present invention provides an improved system, method and computer program product for reducing quadratic phase errors in synthetic aperture radar (SAR) signals. The system, method and computer program product of embodiments of the present invention implement maximum likelihood estimation for autofocusing SAR signals to reduce errors in SAR signals, particularly at low signal/clutter-to-noise ratios and in situations where multiple scatterers are present in the same range line. Advantageously, the system, method and computer program product use superresolution processing along the slow-time, or azimuth, positions to separate closely spaced scatterers on the same range lines and estimate the signal plus clutter components with higher fidelity.

According to one aspect of the present invention, a method is provided for reducing quadratic phase errors in synthetic aperture radar signals from a plurality of range lines where each range line includes a plurality of azimuth positions. The method includes receiving a plurality of slow-time samples representing radar signals for a plurality of azimuth positions for a plurality of range lines. A plurality of corrected samples and an initial quadratic phase error coefficient are identified based upon the slow-time samples. The corrected samples are processed according to a super-resolution signal processing technique, such as a superresolution signal processing technique including Constrained Total Least Squares parameter estimation, to thereby obtain a plurality of estimated Doppler frequencies for a plurality of point scatterers at each range line.

Having processed the corrected samples, a true signal for each range line is then reconstructed based upon the plurality of estimated Doppler frequencies. In this regard, the true signal $\vec{s}_m$ can be reconstructed based upon a plurality of Doppler frequency steering matrices $E_m$. In such instances, the Doppler frequency steering matrices can be represented as follows:

$$E_m = E(f_{1,m}, \ldots, f_{K,m})$$

where $f_{k,m}$ represents the estimated Doppler frequency for each of K point scatterers at each range line m. Then, the true signal can be reconstructed according to the following:

$$\vec{s}_m = E_m \vec{z}_m$$

where $\vec{z}_m$ represents a plurality of estimated complex amplitudes of the scatterers at each range line.

After reconstructing the true signal, a correction to the initial quadratic phase error coefficient is obtained based upon the corrected samples, the true signals and the initial quadratic phase error coefficient. Also, if so desired, a height of a scatterer above a point of reference can be calculated based upon the correction. More particularly with respect to calculating the correction, for example, a correction can be obtained by calculating a new phase estimate based upon the corrected samples, initial quadratic phase error coefficient and true signal, and thereafter summing the initial phase estimate and the new phase estimate to thereby calculate the correction. In such instances, the new phase estimate coefficient $\alpha_{new}$ can be calculated by at least partially maximizing the following functional:

$$F(\alpha) = \sum_m \left| \sum_n \tilde{x}_{m,n,l_{\max}} \bar{s}_{m,n} e^{-j\alpha n^2} \right|^2,$$

starting at $\alpha = \alpha_{l_{\max}}$. In the preceding equation, $\alpha_{l_{\max}}$ represents the initial quadratic phase error coefficient, m represents a range line, n=−N, ..., 0, ... N represents each of 2N+1 slow-time samples at each range line, $\tilde{x}_{m,n,l_{\max}}$ represents the corrected samples, and $s_{m,n}$ represents the true signal.

After obtaining the correction, the method can include refining the correction, if so desired. In this regard, the correction can be refined through one or more iterations by replacing the initial quadratic phase error coefficient with the correction, and calculating further corrected samples based upon the corrected samples and the correction. The processing, reconstructing and obtaining steps can then be repeated to thereby achieve a refined correction.

According to another aspect of the present invention, a method is provided for determining an accuracy of estimated quadratic phase errors in synthetic aperture radar signals. The method of this aspect includes reconstructing a true signal for a plurality of slow-time samples for the plurality of range lines, where the true signals are reconstructed based upon a plurality of estimated complex amplitudes of the scatterers at each range line. Next, a Cramer Rao Bound (CRB) for an estimated quadratic phase error coefficient is then calculated based upon a clutter-plus-receiver noise power, the true signals, and the estimated complex amplitudes of the scatterers. For example, the CRB can be calculated for an estimated quadratic phase error coefficient $\alpha$ according to the following:

$$CRB_\alpha = \left( \sum_m \frac{2}{\sigma_m^2} \left( \sum_n n^4 |s_{m,n}|^2 - \frac{\sum_2^2}{2N+1} \sum_k |z_{k,m}|^2 \right) \right)^{-1}$$

In the preceding equation, $\sigma_m^2$ represents the clutter-plus-receiver noise power, and $$\sum_2^2 = \sum_{-N}^N n^2.$$

After calculating the CRB, a quadratic phase error QPE is then calculated based upon the CRB, such as according to the following:

$$QPE = N^2 \sqrt{CRB_\alpha}$$

where N represents the number of positive slow-time samples greater than zero at each range line.

According to other aspects of the present invention, a system and computer program product for reducing quadratic phase errors are provided.

BRIEF DESCRIPTION OF THE DRAWINGS

Having thus described the invention in general terms, reference will now be made to the accompanying drawings, which are not necessarily drawn to scale, and wherein:

FIG. 4b is a graph illustrating the Fast Fourier Transform (FFT) spectrum of the signal samples of FIG. 4a;

FIG. 4c is a graph illustrating the Constrained Total Least Squares (CTLS) spectrum of the signal samples of FIG. 4a;

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 2:
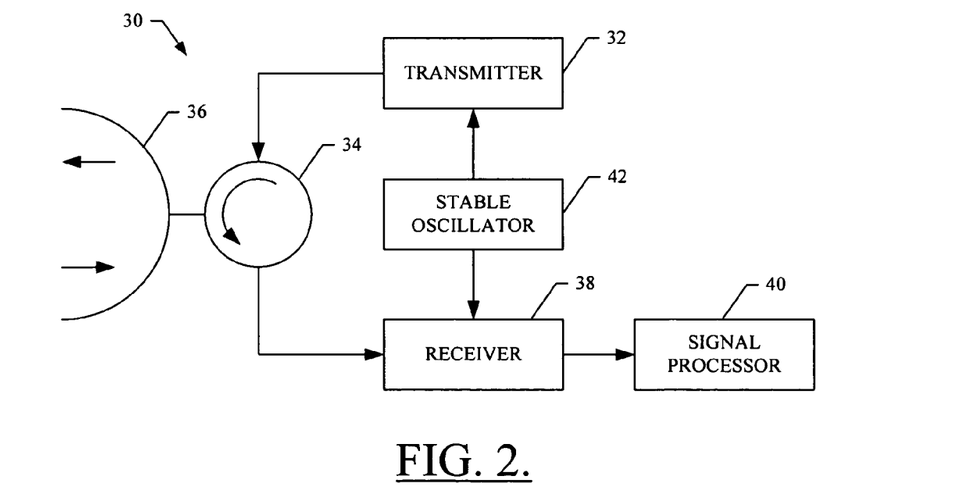
FIG. 2 is a schematic block diagram of a SAR system according to one embodiment of the present invention.

Referring to FIG. 2, a synthetic aperture radar (SAR) system therein is indicated generally by reference numeral 30. To briefly describe a conventional SAR system, a radar signal having a certain frequency is generated by a transmitter 32. The generated signal is sent to a duplexer 34 where it is further transmitted to an antenna 36. The signal is then transmitted from the antenna to a particular target region such as an area of terrain 12 (see FIG. 1). A portion of the signal is reflected off the terrain back to the antenna. The received signal is transmitted back to the duplexer, which forwards the received signal to a receiver 38, which preprocesses the received signal and thereafter passes the signal to a signal processor 40.

The SAR 30 may include a stable oscillator 42 that is provided for correlating the phase relationship between the signal that is generated by the transmitter 32 and the reflected signal that is preprocessed by the receiver 38. The reflected signal received by the receiver is an analog signal. After preprocessing by the receiver, the signal processor integrates the reflected signal with other received signals over time into range lines $R_1, \ldots, R_M$ 16 (shown in FIG. 1), where each range line includes a plurality of azimuth positions $A_{-N}, \ldots, A_N$. The range lines can, in turn, be used to generate an image of the target region 12.

During preprocessing, the receiver 38 mixes the reflected signals with a reference signal from the stable oscillator 42, as described below. This results in signals that each consist of a sequence of digital pulses, where each pulse is represented by a complex number within the pulse. As known to those skilled in the art, the receiver then low pass filters the signals and slows the data rate. Thereafter, the digital signals are passed to the signal processor 40.

Operating in spotlight mode, the antenna 36 typically stays pointed to a fixed area on the ground whose center point is used as the scene center. Thus, referring now to FIG. 3, within the signal processor 40, a motion compensator 44 adjusts the phase of the digital signals so the scene center is at DC. In other words, the motion compensator subtracts the phase contribution from the scene center from each of the digital signals. In this regard, the motion compensator receives motion information from a motion sensor 46. The motion sensor can include any of a number of known devices but, according to one embodiment, the motion sensor includes an inertial navigation system (INS) that senses position information concerning the aircraft 10 can be used to calculate the position of the antenna. Typically, the motion sensor further includes a reference function processor that generates an antenna position signal from the position information from the INS. The antenna position signal is then transmitted to the motion compensator.

Figure 3:
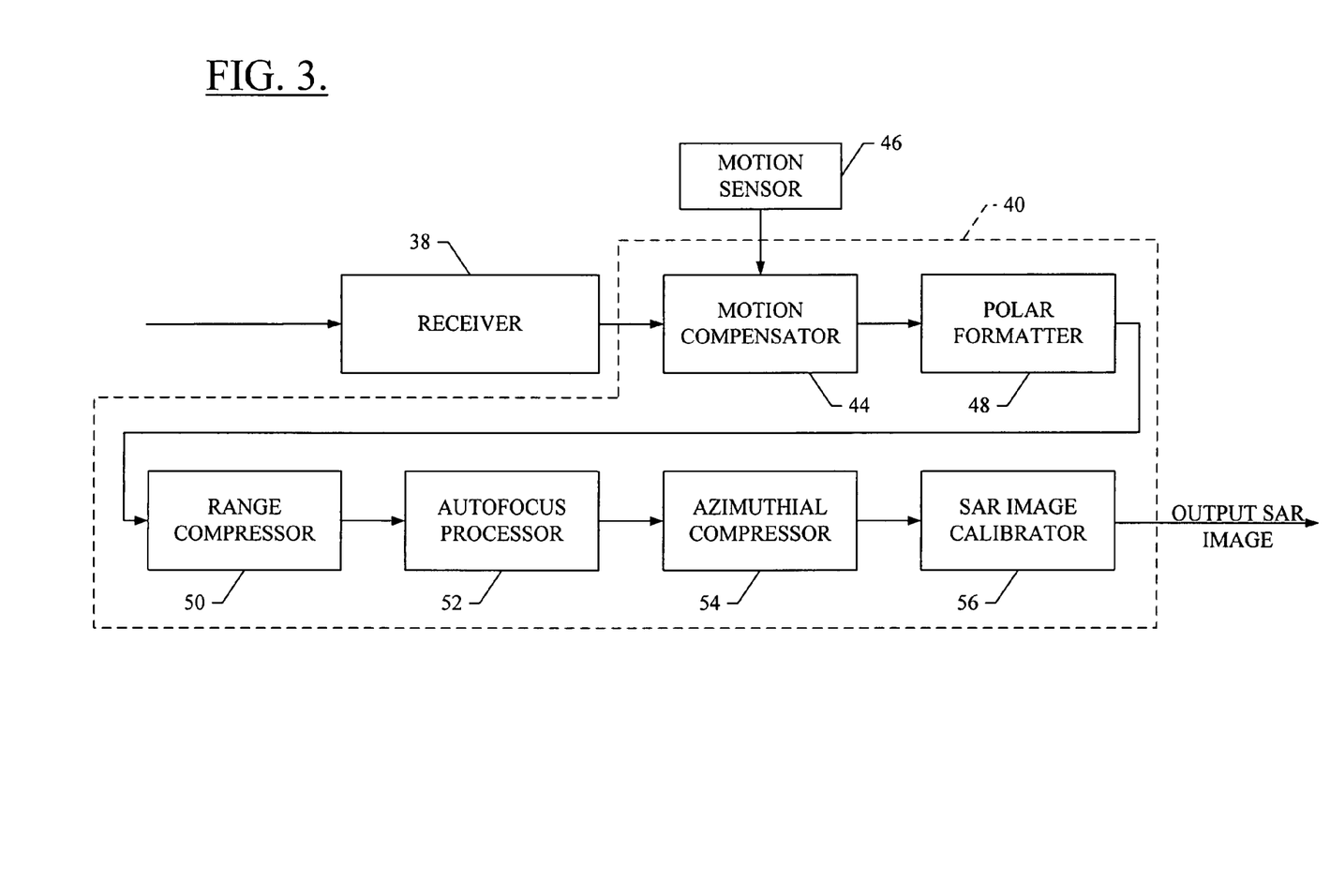
FIG. 3 is a schematic block diagram highlighting the signal processor of the SAR system according to one embodiment of the present invention.

After the motion compensator 44 has adjusted the phase of the digital signals, a polar formatter 48 reformats the digital signals. In this regard, the polar formatter takes the digital signals which represent points on a polar grid and interpolates the digital signals to a Cartesian grid. The reformatted digital signals are then passed to a range compressor 50, which compresses the radar energy of the digital signals in the range dimension. As is known to those skilled in the art, the range compressor compresses the radar energy via a Fourier transform along the range lines or fast time samples (i.e. samples with respect to the frequency band of the radar). Now along ranges where significant target returns exist, the digital signals have strong signal components sampled in slow time.

The digital signals at the output of the range compressor 50 carry information about target scatterers in the azimuth positions and phase errors that need to be removed before a clear SAR image of the scene can be obtained. Thus, the digital signals proceed from the range compressor to an autofocus processor 52, which corrects for phase errors present in the returns along slow time. In this regard, operation of the autofocus processor in accordance with the present invention will be described below. After the autofocus processor 52 has corrected for the phase errors, the digital signals pass to an azimuthial compressor 54, which is composed of a Fourier transform along slow time, as such will be appreciated by those skilled in the art. Finally, the digital signals proceed to an image calibrator 56, which calibrates the image for antenna patterns and other known distortions on the image, as also known to those skilled in the art.

Operation of the autofocus processor 52 will now be described in accordance with embodiments of the present invention. Without loss of generality, the digital signals representing the received radar signals entering the autofocus processor, which are referred to as the phase history of the received signals, can be modeled as consisting of target and clutter returns which are corrupted by phase noise and additive Gaussian receiver/processor noise. It is also commonplace to view the signals as having been filtered to a small patch on the target, typically referred to as a micropatch. Within a micropatch, then, the phase errors remain the same over all of the range lines. The clutter return can be modeled as consisting of the highlights (target like) and the residual, which is uniform and uncorrelated. In general, clutter is correlated from pulse to pulse, however, it is not unreasonable to assume that micropatch uniform clutter returns are uncorrelated. In this regard, as modeled, specular/granular clutter returns can be made part of target return. Also, as modeled, receiver noise is assumed to be uncorrelated.

As is known to those skilled in the art, the phase history from the return at the micropatch level can be modeled in terms of slow-time samples, or azimuth positions, from several range cells as:

$$x_{n,m} = \sum_{k} z_{k,m} e^{i2\pi f_{k,m} nT/(2N+1)} e^{j\alpha n^2} + c_{n,m} + v_{n,m} \quad (1)$$

In equation (1), n represents each of a total of 2N+1 azimuth positions or slow-time samples (i.e., $n = -N, \ldots, 0, \ldots, N$), and m represents each of a total of M range lines or fast-time samples (i.e., $m = 1, \ldots, M$). Also in equation (1), k represents an enumeration of the point scatterers in a given range line, $f_{k,m}$ represents the Doppler frequency of the kth point scatterer at the mth range line, T represents the Dwell duration, $\alpha n^2$ represents the phase error of the signal at the nth azimuth position for all of the range lines, $c_{n,m}$ represents the uniform clutter return of the nth azimuth position at the mth range line, and $v_{n,m}$ represents the receiver noise of the nth azimuth position at the mth range line. Further, $z_{k,m}$ represents the scattering amplitude and initial phase of the kth point scatterer at the mth range line. In this regard, $z_{k,m}$ can be represented as follows:

$$z_{k,m} = A_{k,m} e^{j\theta_{k,m}} \quad (2)$$

where $A_{k,m}$ represents the scattering amplitude, and $\theta_{k,m}$ represents the initial phase.

According to the present invention, the autofocus processor simultaneously estimates the unknowns $\{z_{k,m}, \alpha, f_{k,m}\}_{k,m}$ according to a technique referred to herein as the Maximum Likelihood Estimator Quadratic Autofocus (MLEQAF) method. In this regard, by estimating the unknowns $\{z_{k,m}, \alpha, f_{k,m}\}_{k,m}$ according to the MLEQAF method, the autofocus processor can produce the needed phase compensations for the SAR system 30.

Mathematically and using the given samples and signal model, the MLEQAF method operates by maximizing the log-likelihood function as:

$$\underset{\alpha, \{f_{k,m}\}_{k,m}}{\text{Max}} \left\{ \sum_m \vec{x}_m^* D E_m (E_m^* E_m)^{-1} E_m^* D^* \vec{x}_m \right\} \quad (3)$$

Equivalently, the MLEQAF method can operate by minimizing the least squares functional:

$$\underset{\substack{\{f_{k,m}\}_{k,m} \\ \alpha, \{z_{k,m}\}}}{\text{Min}} \sum_m \| \vec{x}_m \vec{z}_m \|^2 \quad (4)$$

In equations (3) and (4), $\vec{x}_m$ represents a vector of azimuth positions at the mth range line and can be represented as follows:

$$\vec{x}_m = \begin{bmatrix} x_{-N,m} \\ \vdots \\ x_{n,m} \\ \vdots \\ x_{N,m} \end{bmatrix} \quad (5)$$

The variable D, which represents a (2N+1) by (2N+1) diagonal random phasor matrix that contains all phase errors, can be represented as follows:

$$D \equiv D(e^{j\alpha(-N)^2}, \ldots e^{j\alpha n^2}, \ldots e^{j\alpha N^2}) \quad (6)$$

The variable $E_m$ represents the Doppler steering matrix at the mth range line and, thus, $E_m$ contains the information about the Doppler frequencies of the scatterers. In this regard, $E_m$ can be represented as follows:

$$E_m = \quad (7)$$

-continued $$E(f_{1m}, \cdots, f_{K,m}) = \begin{bmatrix} e^{2\pi j f_{1,m} t_{-N}} & \cdots & e^{2\pi j f_{k,m} t_{-N}} & \cdots & e^{2\pi j f_{K,m} t_{-N}} \\ \vdots & \cdots & \vdots & \cdots & \vdots \\ e^{2\pi j f_{1,m} t_n} & \cdots & e^{2\pi j f_{k,m} t_n} & \cdots & e^{2\pi j f_{K,m} t_n} \\ \vdots & \cdots & \vdots & \cdots & \vdots \\ e^{2\pi j f_{1,m} t_N} & \cdots & e^{2\pi j f_{k,m} t_N} & \cdots & e^{2\pi j f_{K,m} t_N} \end{bmatrix}$$

where $$t_n = \frac{nT}{2N+1}$$

is the sampling time instant.

Also, as used in equation (4), $\vec{z}_m$ represents a vector of complex amplitudes of the scatterers at the mth range line, and can be represented as:

$$\vec{z}_m = \begin{bmatrix} z_{1,m} \\ \vdots \\ z_{K_m,m} \end{bmatrix} \quad (8)$$

Looking at the least squares functional of equation (4), the object is to find an optimally accurate set of phase and pure signal parameters: $\{z_{k,m}, \alpha, f_{k,m}\}$, and use the parameters to reconstruct the pure range line samples so that the discrepancy from the observed range line samples is minimized.

The optimization procedures needed to determine the solution from the above data samples is complicated by the nonlinearity of the functional of equation (3) that needs to be maximized and by the large number of unknowns that are estimated. In this regard, the number of unknowns is approximately equal to the number of scatterers on the micropatch and can number in the thousands for typical cases. The MLEQAF method is a method for computing this maximum with a reasonable computational effort which separates the minimization over the frequency variables and the quadratic phase coefficient $\alpha$. In other words, the MLEQAF method provides a real-time solution to the very complex optimization. Advantageously, the MLEQAF method uses superresolution processing to estimate the scatterers' frequency at each range cell. As is known to those skilled in the art, superresolution processing is a method of reconstructing unaliased, high-resolution SAR images. The use of superresolution has the advantage of estimating these frequencies with the highest possible precision. Thus, superresolution facilitates the reconstruction of the specular component of the signal very accurately. As a result, the pure signal component samples (scatterers plus clutter discretes) at each range line are estimated more accurately and when used in the quadratic phase correction, as described below, more accurate phase corrections result. Advantageously, this is the case even when several scatterers are closely spaced, such as within the resolution limits of a Fourier processing system. In this regard, when several scatterers are closely spaced, as such, many prior phase (pulse pair) comparison techniques suffer from lack of accuracy due to coupling of closely spaced signal components.

Figure 4A:
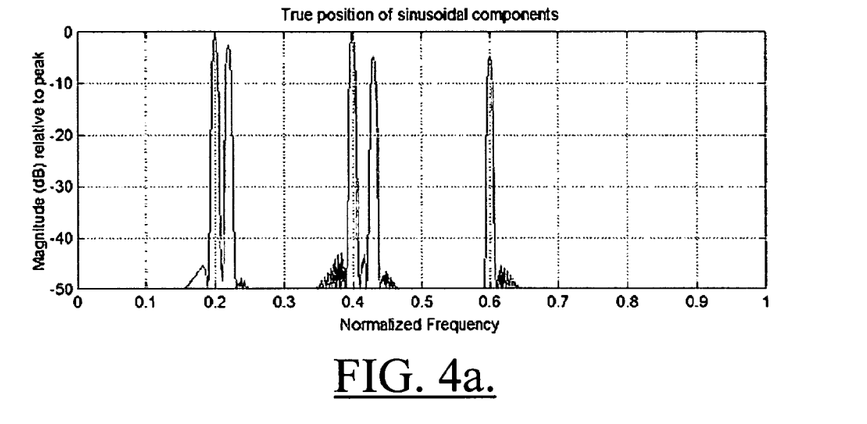
FIG. 4a is a graph illustrating the true frequencies and amplitudes of closely spaced sinusoidal components.
Figure 4B:
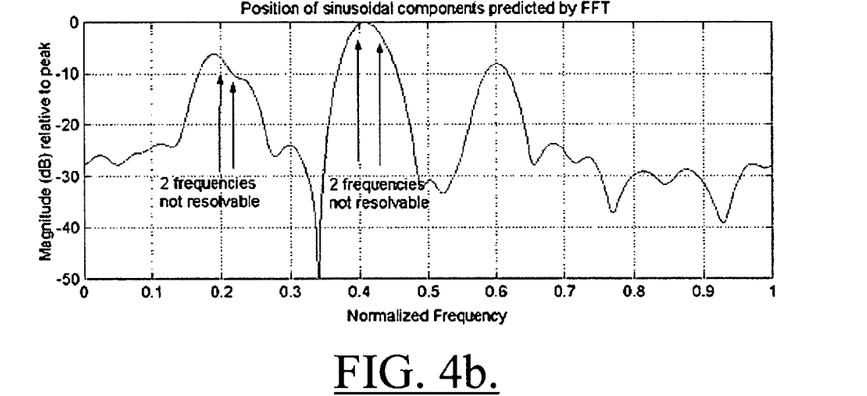
Figure 4C:
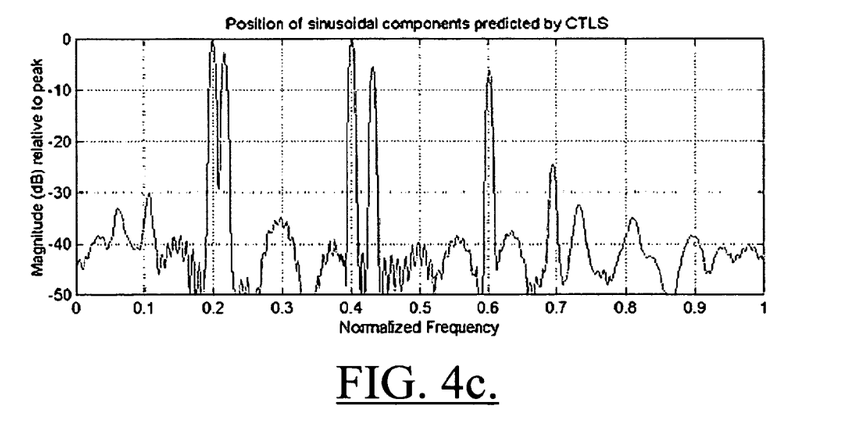

It should be noted that the MLEQAF method employs the Constrained Total Least Squares (CTLS) technique for superresolution, which has been shown to be the most accurate and robust at lower signal-plus-clutter-to-noise ratios. The use of CTLS here overcomes one of the shortcomings of other techniques based on phase differencing or sharpness whose performance suffers in the presence of closely spaced frequency scatterers or low signal-plus clutter-to-noise ratios. For an example application of CTLS to closely spaced sinusoidal components, see FIGS. 4a, 4b and 4c. FIG. 4a illustrates the true frequencies and amplitudes of the components, while FIG. 4b illustrates the Fast Fourier Transform (FFT) spectrum of the signal samples in FIG. 4a. As can be seen, the signals lack the resolution to separate the two pairs of closely spaced sinusoids. In this regard, FIG. 4c illustrates the resulting spectrum by applying CTLS where, although the same samples are processed as in the case of the FFT, CTLS can produce a signal spectrum of similar structure to the true spectrum of the signal.

Figure 5:
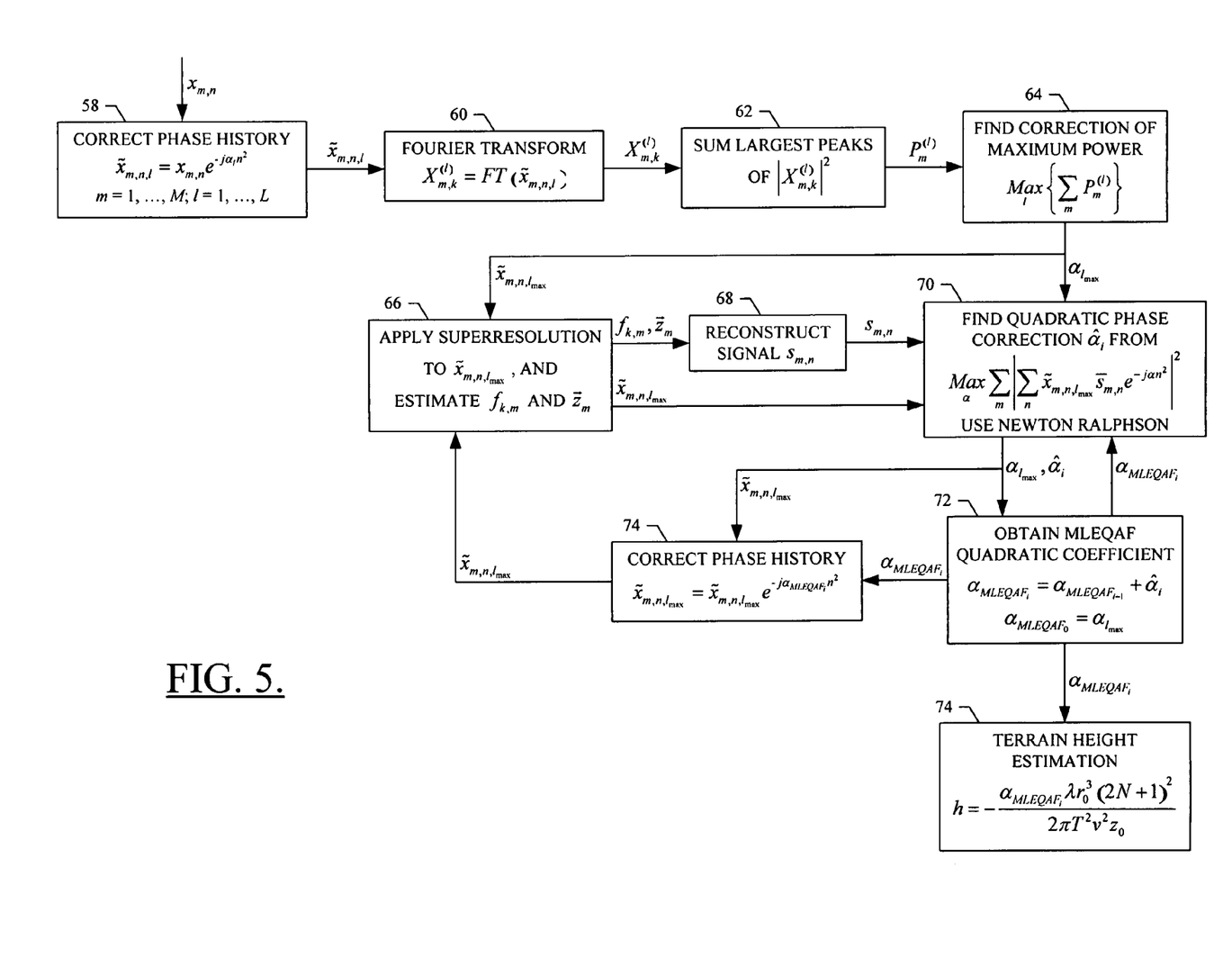
FIG. 5 is an operational block diagram illustrating portions of an autofocus processor according to one embodiment of the present invention.

Referring to FIG. 5, a functional block diagram of the autofocus processor 52 operating according to the MLEQAF method is shown. As shown in block 58, according to the first step in the MLEQAF method, the autofocus processor is initialized by receiving the samples $x_{m,n}$ of the range lines. The autofocus processor then corrects the slow-time samples ($n=-N,\ldots,0,\ldots,N$) along every range line by multiplying the samples by L different quadratic phase error coefficient values $\alpha$, such as in the following manner:

$$\tilde{x}_{m,n,l} = x_{m,n} e^{-j\alpha_l n^2} \quad (9)$$

where $l=1,\ldots,L$ and, as before, $m=1,\ldots,M$. The range of quadratic phase values $\alpha$ can be selected in any of a number of different manners. In one embodiment, for example, the range of quadratic phase values is selected to cover as much as the maximum quadratic phase error that may be present in the signals, which can run in the thousands of degrees. For example, to provide bound between consecutive quadratic phase values that works for high signal-to-noise ratios (SNRs), for example, the difference (granularity) between consecutive quadratic phase error coefficient values, $|\alpha_{l+1} - \alpha_l|$, may be set as follows:

$$|\alpha_{l+1} - \alpha_l| \leq \frac{2\pi \times 1.633689}{(2N+1)^2} \quad (10)$$

Alternatively, for example, in the presence of more moderate noise, the 1.633689 multiplier may be removed from equation (10) to provide a more conservative bound between consecutive quadratic phase values that facilitates setting sufficient estimates of quadratic phase values.

Next, as shown in block 60, for each index m (range lines) and l (quadratic phase values), the Fourier transform (FT) of the corrected slow-time samples $\tilde{x}_{m,n,l}$ is taken with respect to index n (slow-time samples), with the Fourier transforms indexed as $X_{m,k}^{(l)}$. As shown in block 62, the largest peaks of $|X_{m,k}^{(l)}|^2$ at least 8 dB above the noise floor are then found for each m and l. In this regard, the noise floor can be defined as the mean or average of the square of the lowest third (i.e., ~33%) of the values of $|X_{m,k}^{(l)}|^2$ for $k=1,\ldots,K$. The power $P_m^{(l)}$ for a each range line and quadratic coefficient is then calculated by summing the largest peaks of $|X_{m,k}^{(l)}|^2$.

As shown in block 64, the power along all of the range lines is then summed, and the maximum power is found across all of the quadratic coefficients, such as in the following manner:

$$\operatorname*{Max}_l \left\{ \sum_m P_m^{(l)} \right\} \quad (11)$$

As described below, the index of the quadratic phase error coefficient value at the maximum power is referred to as $l_{max}$. To conclude initialization of the autofocus processor 52, the corrected slow-time samples and phase error coefficient values for $l_{max}$ (i.e., $\tilde{x}_{m,n,l_{max}}$ and $\alpha_{l_{max}}$) are identified, where $\alpha_{l_{max}}$ can be considered an initial estimated phase error coefficient.

After initializing the autofocus processor 52, a fine search is performed for the quadratic phase error coefficient $\alpha$, or to more particularly refine the initial estimated phase error coefficient $\alpha_{l_{max}}$. More particularly, as shown in block 66, the corrected slow-time samples $\tilde{x}_{m,n,l_{max}}$ are processed according to a superresolution signal processing method employing the Constrained Total Least Squares (CTLS) parameter estimation technique. In this regard, the corrected slow-time samples $\tilde{x}_{m,n,l_{max}}$ are fitted in a least squares sense to a set of complex sinusoids of unknown complex amplitude and frequency, where each sinusoid corresponds to a target scatterer or clutter discrete. By employing superresolution processing according to the CTLS technique, the main/dominant Doppler frequencies $f_{k,m}$ of each point scatterer at each range line m can be estimated. According to superresolution processing, the set of sinusoids is estimated from the slow-time samples:

$$\vec{x}_m = \begin{bmatrix} x_{-N,m,l_{max}} \\ \vdots \\ x_{n,m,l_{max}} \\ \vdots \\ x_{N,m,l_{max}} \end{bmatrix} \quad (12)$$

A linear prediction model is then fitted to the slow-time samples. The CTLS technique is then used to solve for linear prediction coefficients. Next, the Doppler frequencies are estimated from the roots of a polynomial including the linear prediction coefficients. It should be noted that the residual to the least squares sinusoidal fit can be taken to be the uniform clutter+thermal noise power $\sigma_m^2$, which can be used to predict the performance of the MLEQAF method, as explained below with reference to FIG. 6. Such a superresolution processing method employing the CTLS technique is described further in U.S. Pat. No. 5,748,507, the contents of which is hereby incorporated by reference in its entirety.

After determining the estimated Doppler frequencies of the scatterers, the estimated frequencies can then be used to form the Doppler frequency steering matrices $E_m$, such as according to equation (7). Thus, the Doppler frequency steering matrices $E_m$ can be represented as follows:

$$E_m = E(f_{1,m}, \ldots, f_{K,m}) \quad (13)$$

After determining the Doppler frequency steering matrices, the vector of complex amplitudes of the scatterers at each range cell can be estimated according to the following:

$$\vec{z}_m = \begin{bmatrix} z_{1,m} \\ \vdots \\ z_{K_m,m} \end{bmatrix} = (E_m^* E_m)^{-1} E_m^* \vec{x}_m \quad (14)$$

After determining the estimated Doppler frequencies and estimated complex amplitudes of the scatterers, the frequencies and amplitudes can be used to determine a reconstructed, true signal $\vec{s}_m$ for each range line, as shown in block 68. In this regard, the reconstructed true signals can be determined by multiplying the respective Doppler frequency steering matrix $E_m$ with the estimated complex amplitude $\vec{z}_m$. Written notationally, the reconstructed true signal $\vec{s}_m$ can be determined as follows:

$$\vec{s}_m = \begin{bmatrix} s_{m,-N} \\ \vdots \\ s_{m,n} \\ \vdots \\ s_{m,N} \end{bmatrix} = \quad (15)$$

$$E_m \vec{z}_m = \begin{bmatrix} e^{2\pi j f_{1,m} l_{-N}} & \cdots & e^{2\pi j f_{k,m} l_{-N}} & \cdots & e^{2\pi j f_{K,m} l_{-N}} \\ \vdots & \cdots & \vdots & \cdots & \vdots \\ e^{2\pi j f_{1,m} l_n} & \cdots & e^{2\pi j f_{k,m} l_n} & \cdots & e^{2\pi j f_{K,m} l_n} \\ \vdots & \cdots & \vdots & \cdots & \vdots \\ e^{2\pi j f_{1,m} l_N} & \cdots & e^{2\pi j f_{k,m} l_N} & \cdots & e^{2\pi j f_{k,m} l_N} \end{bmatrix} \begin{bmatrix} z_{1,m} \\ \vdots \\ z_{K_m,m} \end{bmatrix}$$

As will be appreciated, the reconstructed true signals are a representation of the response of target scatterers and clutter discretes excluding the electronic/thermal noise. Thus, if so desired, the signal vector $\vec{s}_m$ can be made relatively close to the data vector $\vec{x}_m$ by multiplying the signal vector, element-wise with the following quadratic phase vector:

$$\begin{bmatrix} e^{j\alpha_{l_{max}}(-N)^2} \\ \vdots \\ e^{j\alpha_{l_{max}} n^2} \\ \vdots \\ e^{j\alpha_{l_{max}} N^2} \end{bmatrix} \quad (16)$$

As shown in block 70, the reconstructed true signal $\vec{s}_m$ and the corrected slow-time samples $\tilde{x}_{m,n,l_{max}}$ can be exploited to refine the initial estimated phase error coefficient $\alpha_{l_{max}}$. In this regard, the initial estimated phase error coefficient $\alpha_{l_{max}}$ can be refined in accordance with the maximum likelihood principle by maximizing the functional:

$$F(\alpha) = \sum_m \left| \sum_n \tilde{x}_{m,n,l_{max}} \bar{s}_{m,n} e^{-j\alpha n^2} \right|^2 \quad (17)$$

starting at $\alpha = \alpha_{l_{max}}$. In this regard, the Newton-Raphson technique can be implemented to find $\text{Max}_a F(\alpha)$. More particularly, a new estimated phase error coefficient $\alpha_{new}$ can be calculated and recalculated for one or more iterations as follows:

$$\alpha_{new} = \alpha_{old} - \frac{F'(\alpha_{old})}{F''(\alpha_{old})} \quad (18)$$

where $\alpha_{old}$ is set to equal $\alpha_{lmax}$ for the first iteration. Also in equation (18), $F'(\alpha)$ and $F''(\alpha)$ represent the first and second derivatives of the function F, respectively. For subsequent iterations, $\alpha_{old}$ is set to equal $\alpha_{new}$ for the most immediate, previous iteration. Then, following the final iteration, an estimated phase error coefficient $\hat{\alpha}$ can be defined and set equal to $\alpha_{new}$. The number of iterations can vary as desired, but is set equal to two in one embodiment of the present invention.

Then, as shown in block 72, the autofocus processor 52 calculates an optimal, or MLEQAF, phase correction $\alpha_{MLEQAF}$ by summing the initial estimated phase error coefficient $\alpha_{l_{max}}$ and estimated phase error coefficient $\hat{\alpha}$. As also shown, the optimal phase correction can be further refined by repeating portions of the MLEQAF method for one or more (e.g., 3) iterations i, if so desired. Thus, for each of the iterations, the autofocus processor further corrects the phase history based upon the optimal phase correction to remove more of the quadratic phase in $\tilde{x}_{m,n,l_{max}}$ such as in the following manner:

$$\tilde{x}_{m,n,l_{max}} = x_{m,n,l_{max}} e^{-j\alpha_{MLEQAF_i} n^2} \quad (19)$$

The further corrected slow-time samples $\tilde{x}_{m,n,l_{max}}$ are then again processed according to the superresolution signal processing method to again estimate the main/dominant Doppler frequencies $f_{k,m}$ and complex amplitudes $\vec{z}_m$ of the scatterers (see block 66). A reconstructed, true signal $\vec{s}_m$ for each range line is again constructed (see block 68). Then, the optimal phase correction $\alpha_{MLEQAF}$ for the previous iteration is further refined in accordance with the maximum likelihood principle based upon the again reconstructed true signal and the further corrected slow-time samples $\tilde{x}_{m,n,l_{max}}$ (see block 70).

As is well known to those skilled in the art, the quadratic coefficient that produces the quadratic phase error in the phase history can be attributed to a differential in the height of the terrain being imaged. Thus, the autofocus processor 52 (or another portion of the receiver 40 of the SAR system) can calculate the scatterer height above the ground (or other point of reference) based upon the optimal phase correction $\alpha_{MLEQAF_i}$, if so desired. More particularly, as shown in block 72, the height h of the scatterer above the ground at the center of the target region 12 can be calculated as follows:

$$h = -\frac{\alpha_{MLEQAF_i} \lambda r_0^3 (2N+1)^2}{2\pi T^2 v^2 z_0} \quad (20)$$

In the preceding equation (20), $\lambda$ represents the wavelength at the center frequency of the SAR system, $r_0$ represents the distance of the SAR system to the center of the target region at the middle of the Dwell duration, v represents the velocity of the radar platform, $z_0$ represents the height of the SAR system above the ground and, as before, T represents the Dwell duration. Also, as can be seen from equation (20), the height of the terrain is linearly proportional to the quadratic phase correction $\alpha_{MLEQAF}$, and therefore inherits its accuracy.

Figure 6:
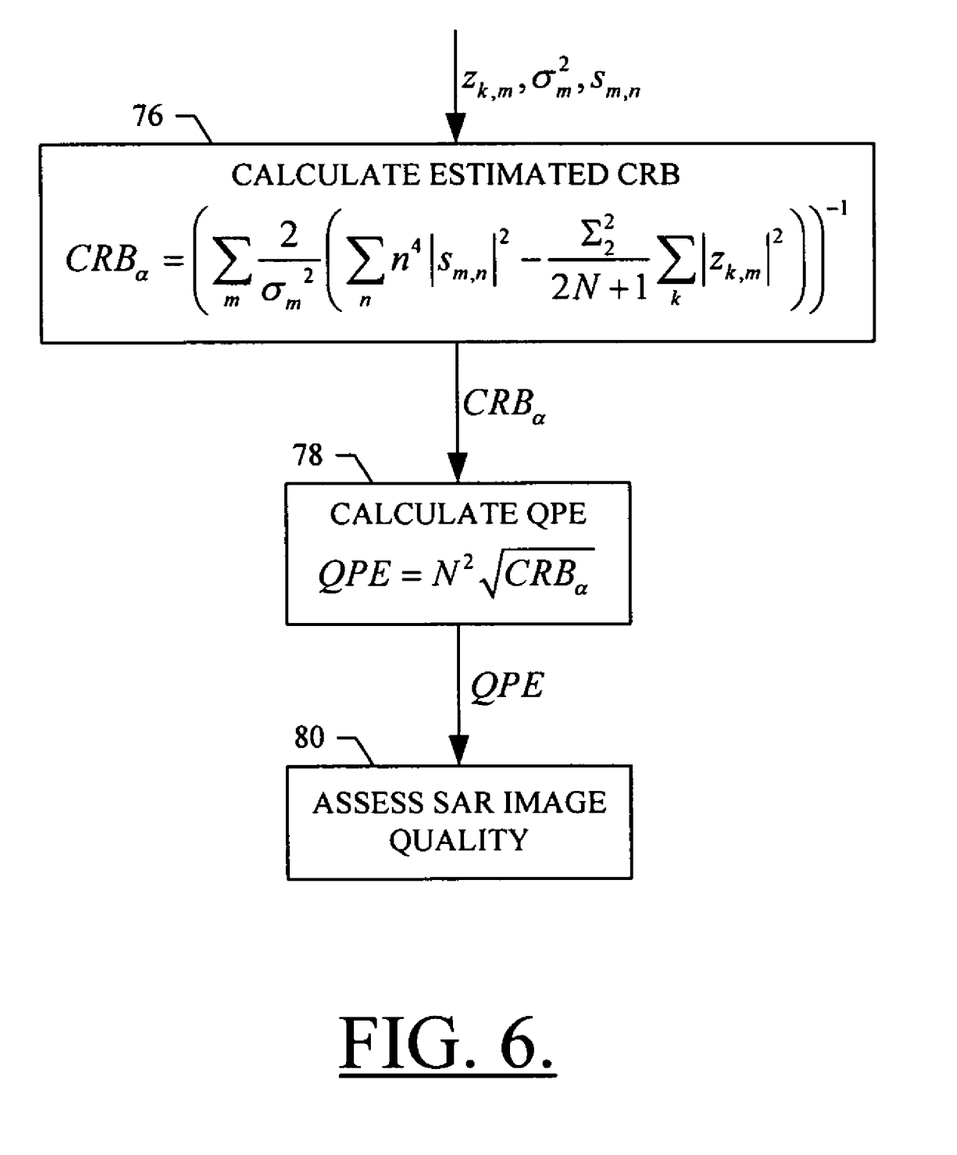
FIG. 6 is an operational block diagram illustrating a processing element for predicting performance of operation of the autofocus processor data, in accordance with one embodiment of the present invention.

Referring now to FIG. 6, performance of the MLEQAF method can be predicted based upon the Cramer Rao Bound (CRB). As is known, the CRB yields the lowest bound on the covariance that any unbiased estimator can attain. The CRB is typically computable in closed analytic form and, as such, it has value in predicting performance of signal parameter estimators and, in particular, those appearing in the phase of superimposed signals such as tones, chirps, etc. Generally, the CRB is a local estimator such that its prediction is good above a certain threshold Signal to Clutter+Noise ratio (SCNR), which usually coincides with the operational range of most radar processing algorithms. The variance of the MLEQAF phase-error estimator is given by a quadratic function of the slow-time sample index and depends upon parameters such as the signal-to-noise, signal-to-clutter ratios, the number of samples, etc. Advantageously, all such parameters can be pre-computed in closed analytic form to either predict performance of the MLEQAF method before implementation or estimate the phase accuracy from the measured parameters.

As shown in block 76 of FIG. 6, predicting the performance of the MLEQAF method includes receiving the vector of estimated complex amplitudes $z_{k,m}$, uniform clutter+thermal noise power $\sigma_m^2$, and reconstructed, true signal $s_{m,n}$. In this regard, $z_{k,m}$ and $\sigma_m^2$ can be received from processing the corrected slow-time samples $\tilde{x}_{m,n,l_{max}}$ according to the superresolution signal processing method employing the CTLS parameter estimation technique, as explained above (see block 66). The reconstructed true signals $s_{m,n}$, on the other hand, can be received from processing the estimated Doppler frequencies $f_{k,m}$ and complex amplitudes $z_{k,m}$ (see block 68).

Irrespective of how $z_{k,m}$, $\sigma_m^2$ and $s_{m,n}$ are received, however, the estimated CRB for $\alpha$ is calculated as follows:

$$CRB_\alpha = \left( \sum_m \frac{2}{\sigma_m^2} \left( \sum_n n^4 |s_{m,n}|^2 - \frac{\Sigma_2^2}{2N+1} \sum_k |z_{k,m}|^2 \right) \right)^{-1} \quad (21)$$

where $\Sigma_2^2$ can be defined as:

$$\Sigma_2^2 = \sum_{-N}^{N} n^2 \quad (22)$$

Next, an estimated quadratic phase error (QPE) is calculated based upon $CRB_\alpha$ and the number of positive slow-time samples greater than zero, i.e., N. More particularly, as shown in block 78, the QPE is calculated as follows:

$$QPE = N^2 \sqrt{CRB_\alpha} \quad (23)$$

The QPE represents the expected quadratic phase error at the end-points of the phase history data array, typically where the error is at a maximum. Thus, the QPE can be assessed to predict the performance of the MLEQAF method, as shown in block 80. In this regard, for a number of applications, a QPE of less than 20° is typically acceptable because such an error does not deteriorate the SAR image. However, as the QPE increases above 40°, the resolution of the SAR image typically begins to significantly deteriorate.

The methods of embodiments of the present invention are generally implemented by one or more computer processing elements, such as microprocessors or the like. For example, all or a portion of the methods can be performed by the autofocus processor 52 which, in turn, may be comprised of one or more computer processing elements, such as microprocessors or the like. The computer processing elements typically operate under the control of a computer program product. The computer program product includes a computer-readable storage medium, such as a non-volatile storage medium, and computer-readable program code portions, such as a series of computer instructions, embodied in the computer-readable storage medium. Typically, the computer program product is stored by the computer processing element or a related memory device.

In this regard, FIGS. 2, 3, 5 and 6 are block diagrams and control flow illustrations of methods, systems and program products according to the invention. It will be understood that each block or step of the block diagram, flowchart and control flow illustrations, and combinations of blocks in the block diagram, flowchart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram or control flow illustrations support combinations of means for performing the specified functions, combinations of steps for performing the specified functions and program instruction means for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims.

Although specific terms are employed herein, they are used in a generic and descriptive sense only and not for purposes of limitation.

What is claimed is:

1. A method of reducing quadratic phase errors in synthetic aperture radar signals from a plurality of range lines where each range line includes a plurality of azimuth positions, the method comprising:
   receiving a plurality of slow-time samples representing radar signals for a plurality of azimuth positions for a plurality of range lines;
   identifying a plurality of corrected samples and an initial quadratic phase error coefficient based upon the slow-time samples;
   processing the corrected samples according to a super-resolution signal processing technique to thereby obtain a plurality of estimated Doppler frequencies for a plurality of point scatterers at each range line;
   reconstructing a true signal for each range line based upon the plurality of estimated Doppler frequencies; and
   obtaining a correction to the initial quadratic phase error coefficient based upon the corrected samples, the true signals and the initial quadratic phase error coefficient.

2. A method according to claim 1, wherein obtaining a correction comprises:
   calculating a new phase estimate based upon the corrected samples, initial quadratic phase error coefficient and true signal; and
   summing the initial phase estimate and the new phase estimate to thereby calculate the correction.

3. A method according to claim 2, wherein calculating a new phase estimate comprises calculating a new phase estimate $\alpha_{new}$ by at least partially maximizing the following functional:

$$F(\alpha) = \sum_m \left| \sum_n \tilde{x}_{m,n,l_{max}} \bar{s}_{m,n} e^{-j\alpha n^2} \right|^2,$$

starting at $\alpha = \alpha l_{max}$, and wherein $\alpha l_{max}$ represents the initial quadratic phase error coefficient, m represents a range line, n=−N, . . . , 0, . . . N represents each of 2N+1 slow-time samples at each range line, $\tilde{x}_{m,n,l_{max}}$ represents the corrected samples, and $s_{m,n}$ represents the true signal.

4. A method according to claim 1, wherein processing the corrected samples comprises processing the corrected samples according to a superresolution signal processing technique including Constrained Total Least Squares parameter estimation.

5. A method according to claim 1, wherein reconstructing a true signal comprises reconstructing a true signal based upon a plurality of Doppler frequency steering matrices $E_m$, wherein the plurality of Doppler frequency steering matrices are represented as follows:

$$E_m = E(f_{1,m}, \ldots, f_{K,m}),$$

and wherein $f_{k,m}$ represents the estimated Doppler frequency for each of K point scatterers at each range line m.

6. A method according to claim 5, wherein reconstructing a true signal comprises reconstructing the true signal $\vec{s}_m$ according to the following:

$$\vec{s}_m = E_m \vec{z}_m,$$

and wherein $\vec{z}_m$ represents a plurality of estimated complex amplitudes of the scatterers at each range line.

7. A method according to claim 1 further comprising:
   replacing the initial quadratic phase error coefficient with the correction;
   calculating further corrected samples based upon the corrected samples and the correction; and
   repeating the processing, reconstructing and obtaining steps,
   wherein the replacing, calculating and repeating steps occur for at least one iteration.

8. A method according to claim 1 further comprising:
   calculating a height of a scatterer above a point of reference based upon the correction.

9. A system for reducing quadratic phase errors in synthetic aperture radar signals from a plurality of range lines where each range line includes a plurality of azimuth positions, the system comprising:
   an autofocus processor for receiving a plurality of slow-time samples representing radar signals for a plurality of azimuth positions for a plurality of range lines,
   wherein the autofocus processor is adapted to identify a plurality of corrected samples and an initial quadratic phase error coefficient based upon the slow-time samples,
   wherein the autofocus processor is adapted to process the corrected samples according to a superresolution signal processing technique to thereby obtain a plurality of estimated Doppler frequencies for a plurality of point scatterers at each range line,
   wherein the autofocus processor is adapted to reconstruct a true signal for each range line based upon the plurality of estimated Doppler frequencies, and
   wherein the autofocus processor is adapted to obtain a correction to the initial quadratic phase error coefficient based upon the corrected samples, the true signals and the initial quadratic phase error coefficient.

10. A system according to claim 9, wherein the autofocus processor is adapted to obtain the correction by calculating a new phase estimate based upon the corrected samples, initial quadratic phase error coefficient and true signal, and summing the initial phase estimate and the new phase estimate to thereby calculate the correction.

11. A system according to claim 10, wherein the autofocus processor is adapted to calculate the new phase estimate $\alpha_{new}$ by at least partially maximizing the following functional:

$$F(\alpha) = \sum_m \left| \sum_n \tilde{x}_{m,n,l_{max}} \bar{s}_{m,n} e^{-j\alpha n^2} \right|^2$$

starting at $\alpha = \alpha_{l_{max}}$, and wherein $\alpha_{l_{max}}$ represents the initial quadratic phase error coefficient, m represents a range line, n=−N, . . . , 0, . . . N represents each of 2N+1 slow-time samples at each range line, $\tilde{x}_{m,n,l_{max}}$ represents the corrected samples, and $s_{m,n}$ represents the true signal.

12. A system according to claim 9, wherein the autofocus processor is adapted to process the corrected samples according to a superresolution signal processing technique including Constrained Total Least Squares parameter estimation.

13. A system according to claim 9, wherein the autofocus processor is adapted to reconstruct the true signal based upon a plurality of Doppler frequency steering matrices $E_m$, wherein the plurality of Doppler frequency steering matrices are represented as follows:

$$E_m = E(f_{1,m}, \ldots, f_{K,m}),$$

and wherein $f_{k,m}$ represents the estimated Doppler frequency for each of K point scatterers at each range line m.

14. A system according to claim 13, wherein the autofocus processor is adapted to reconstruct the true signal $\vec{s}_m$ according to the following:

$$\vec{s}_m = E_m \vec{z}_m,$$

and wherein $\vec{z}_m$ represents a plurality of estimated complex amplitudes of the scatterers at each range line.

15. A system according to claim 9, wherein, for at least one iteration, the autofocus processor is further adapted to replace the initial quadratic phase error coefficient with the correction, calculate further corrected samples based upon the corrected samples and the correction, and again process the corrected samples, reconstruct a true signal and obtain a correction.

16. A computer program product of reducing quadratic phase errors in synthetic aperture radar signals from a plurality of range lines where each range line includes a plurality of azimuth positions, the computer program product comprising a computer-readable storage medium having computer-readable program code portions stored therein, the computer-readable program portions comprising:

a first executable portion for receiving a plurality of slow-time samples representing radar signals for a plurality of azimuth positions for a plurality of range lines;

a second executable portion for identifying a plurality of corrected samples and an initial quadratic phase error coefficient based upon the slow-time samples;

a third executable portion for processing the corrected samples according to a superresolution signal processing technique to thereby obtain a plurality of estimated Doppler frequencies for a plurality of point scatterers at each range line;

a fourth executable portion for reconstructing a true signal for each range line based upon the plurality of estimated Doppler frequencies; and a fifth executable portion for obtaining a correction to the initial quadratic phase error coefficient based upon the corrected samples, the true signals and the initial quadratic phase error coefficient.

17. A computer program product according to claim 16, wherein the fifth executable portion is adapted to obtain the correction by calculating a new phase estimate based upon the corrected samples, initial quadratic phase error coefficient and true signal, and summing the initial phase estimate and the new phase estimate to thereby calculate the correction.

18. A computer program product according to claim 17, wherein the fifth executable portion is adapted to calculate the new phase estimate $\alpha_{new}$ by at least partially maximizing the following functional:

$$F(\alpha) = \sum_m \left| \sum_n \tilde{x}_{m,n,l_{\max}} \bar{s}_{m,n} e^{-j\alpha n^2} \right|^2,$$

starting at $\alpha = \alpha_{l_{\max}}$, and wherein $\alpha_{l_{\max}}$ represents the initial quadratic phase error coefficient, m represents a range line, $n = -N, \ldots, 0, \ldots N$ represents each of 2N+1 slow-time samples at each range line, $\tilde{x}_{m,n,l_{\max}}$ represents the corrected samples, and $s_{m,n}$ represents the true signal.

19. A computer program product according to claim 16, wherein the third executable portion is adapted to process the corrected samples according to a superresolution signal processing technique including Constrained Total Least Squares parameter estimation.

20. A computer program product according to claim 16, wherein the fourth executable portion is adapted to reconstruct the true signal based upon a plurality of Doppler frequency steering matrices $E_m$, wherein the plurality of Doppler frequency steering matrices are represented as follows:

$$E_m = E(f_{1,m}, \ldots, f_{K,m}),$$

and wherein $f_{k,m}$ represents the estimated Doppler frequency for each of K point scatterers at each range line m.

21. A computer program product according to claim 20, wherein the fourth executable portion is adapted to reconstruct the true signal $\vec{s}_m$ according to the following:

$$\vec{s}_m = E_m \vec{z}_m,$$

and wherein $\vec{z}_m$ represents a plurality of estimated complex amplitudes of the scatterers at each range line.

22. A computer program product according to claim 16 further comprising:

a sixth executable portion for replacing the initial quadratic phase error coefficient with the correction; and a seventh executable portion for calculating further corrected samples based upon the corrected samples and the correction; and an eighth executable portion for repeating the processing, reconstructing and obtaining steps, wherein the sixth, seventh and eighth executable portions are adapted to perform the replace, calculate and repeat steps for at least one iteration.

* * * * *